United States Patent
Jacobs et al.

(10) Patent No.: US 10,473,546 B2
(45) Date of Patent: Nov. 12, 2019

(54) HERMETIC PRESSURE SENSOR HAVING A BENDING PART

(71) Applicant: SENSATA TECHNOLOGIES, INC., Attleboro, MA (US)

(72) Inventors: Frank Hendri Jacobs, Broekland (NL); Wico Hopman, Deventer (NL); Jochem Hendrik Talsma, Deventer (NL); Jochem Christiaan Nijs, Enschede (NL); Erik Hop, Amersfoort (NL)

(73) Assignee: Sensata Technologies, Inc., Attleboro, MA (US)

( * ) Notice: Subject to any disclaimer, the term of this patent is extended or adjusted under 35 U.S.C. 154(b) by 120 days.

(21) Appl. No.: 15/222,305

(22) Filed: Jul. 28, 2016

(65) Prior Publication Data
US 2017/0038272 A1   Feb. 9, 2017

(30) Foreign Application Priority Data

Aug. 7, 2015   (EP) .................................. 15180231

(51) Int. Cl.
*G01L 19/14* (2006.01)
*G01L 19/06* (2006.01)
*G01L 9/00* (2006.01)

(52) U.S. Cl.
CPC .......... *G01L 19/148* (2013.01); *G01L 9/0054* (2013.01)

(58) Field of Classification Search
CPC . H01L 2224/48091; H01L 2924/00014; H01L 2224/73265; H01L 2224/48465; G01L 9/0075; G01L 19/147; G01L 19/141; G01L 19/0084; G01L 19/148; G01L 19/0007; G01L 19/0645; G01L 19/0046; G01L 19/143
See application file for complete search history.

(56) References Cited

U.S. PATENT DOCUMENTS

| | | | |
|---|---|---|---|
| 4,939,497 A * | 7/1990 | Nishida | G01L 19/147 338/4 |
| 5,184,515 A | 2/1993 | Terry et al. | |
| 6,351,998 B1 | 3/2002 | Hohnstadt et al. | |
| 6,568,276 B1 | 5/2003 | Ciminelli | |
| 6,763,724 B2 | 7/2004 | DiPaola et al. | |
| 7,458,275 B2 * | 12/2008 | Kleven | G01L 19/003 73/745 |

(Continued)

OTHER PUBLICATIONS

European Search Report for EPO Serial No. 16166285.3 dated Oct. 7, 2016 from the European Patent Office in Munich, Germany, 11 pages total.

*Primary Examiner* — Lisa M Caputo
*Assistant Examiner* — Brandi N Hopkins
(74) *Attorney, Agent, or Firm* — Burns & Levinson, LLP; Joseph M. Maraia; George N. Chaclas (57) ABSTRACT

A hermetic pressure sensor for measuring a fluid pressure includes a hermetic housing, formed of a first housing structure with a membrane section, a second housing structure hermetically connected to the first structure, and one or more strain sensing elements attached to the membrane section. The second housing structure includes openings for one or more electrical pins while a non-conductive hermetic seal holds the electrical pins in place. The pressure sensor measures the pressure of fluid entering the housing while also providing a hermetic seal.

18 Claims, 5 Drawing Sheets

(56) References Cited

U.S. PATENT DOCUMENTS

| | | |
|---|---|---|
| 8,210,048 B2 | 7/2012 | Funken et al. |
| 8,516,897 B1 | 8/2013 | Jones et al. |
| 2002/0100948 A1 | 8/2002 | Yoshihara et al. |
| 2009/0282926 A1 | 11/2009 | Hauer et al. |
| 2013/0062710 A1* | 3/2013 | Dehe .................. G01L 9/0016 257/415 |
| 2014/0033824 A1* | 2/2014 | Habibi ................ G01L 9/0073 73/724 |

* cited by examiner

HERMETIC PRESSURE SENSOR HAVING A BENDING PART

CROSS-REFERENCE TO RELATED APPLICATION

This application claims priority to and the benefit of European Patent Application No. EP15180231 filed Aug. 7, 2015, which is incorporated herein by reference.

TECHNICAL FIELD

The subject technology relates to hermetic pressure sensors. More particularly the subject technology relates to hermetic pressure sensors to be used in automatic transmission applications.

BACKGROUND

The main task of a hermetic, i.e. fluid-tight, pressure sensor is to measure pressure in harsh or dangerous environmental conditions. A first important reason to have a hermetic sensor is that the environment can damage the elements of the sensor which are enclosed in the housing of the sensor. Damage could make the sensor malfunction. A second important reason is to have a constant internal pressure which is important for low pressure sensing accuracy. In practice, a sensor housing is considered hermetic when during a Helium leak test, the leakage does not exceed the limit of approximately $5 \times 10^{-8}$ mBar×l/sec He.

A pressure sensor is known from U.S. Pat. No. 6,763,724 B2. This pressure sensor has a tubular port fitting and a tubular housing, which results in the design being relatively long. A flange of the housing and the port fitting are welded to a support flange forming a hermetic seal. A compressive force on an O-ring forms a liquid-tight seal and maintains an axial load on the entire stack of components in the housing. Consequently, the housing is not gas-tight and the electrical elements are not hermetical sealed in the housing.

For transmission applications, there is a need for smaller, fully hermetic sensors. This means that the sensor should have less height. Furthermore, electronics of the sensor need to be sealed from the measured media, in particular to prevent possible copper-sulfur corrosion.

Smaller pressure sensors are known from U.S. Publication No. 20090282926 A1 and U.S. Pat. No. 8,516,897 B1. These sensors comprise a hermetic housing for their sensor elements. They use a sensor chip having a glass base which is disposed in a hermetically sealed housing. A diaphragm is formed in the sensor chip. The glass base is fused to the housing to form a glass to metal seal. A glass to metal seal is prone to failure in at least two cases: 1) a lack of a hermetic connection (e.g., due to a fault in the soldering process); and 2) glass is a brittle material that may crack when pressure peaks and dynamic forces are applied. As the fluid pressure is acting directly on the sensor chip, the glass base, and the connections (e.g., glass-silicon connection and glass-metal connection), there is a potential risk that the pressure sensor will malfunction due to damage of the glass base or any of the glass-connections.

SUMMARY OF INVENTION

It is an object of the present technology to provide an improved hermetic pressure sensor with a gas-tight housing structure which is at least one of the following features: reliable; cheaper to manufacture; producible in high volume by means of semi- or fully automatic production processes; long lasting and/or robust to harsh pressure media; less sensitive to point forces acting on the sensor housing; and able to withstand the temperature and vibration typical of an automotive transmission application. The sensor can also be used for other automotive applications like liquid fuel pressure sensing and sensing oil pressure.

According to a first aspect of the technology, this object is achieved by a hermetic pressure sensor having the features of claim 1. Advantageous embodiments and further ways of carrying out the subject technology may be attained by the measures mentioned in the other claims.

A hermetic pressure sensor according to the subject technology includes a hermetic housing having a first housing structure which includes a membrane section, the membrane section being exposed to the fluid pressure. The hermetic housing also includes a second housing structure which is hermetically connected to the first housing structure. The second housing structure has a housing part which has at least two openings with at least two electrical connection pins passing through the openings. The electrical pins are affixed in the openings by a non-conductive and hermetic sealing material. One or more strain sensing elements are arranged in the hermetic housing and attached to the membrane section of the first housing. The hermetic housing may be disk-shaped. The strain sensing element may be a micro fused silicon strain gage.

In one embodiment, the first housing structure has a base part with a pressure supply opening and a membrane part including a membrane section, the membrane part being hermetically connected to the base part. In this embodiment, the base part, the membrane part, and the pressure supply opening define a cavity, which puts the membrane section in pressure contact with the fluid. The base part and the membrane part may be hermetically connected by an annular weld.

In another embodiment, the first housing structure and the second housing structure may be hermetically connected by an annular weld. The first housing structure may include an annular wave-like section around the membrane section. Additionally, at least one cross section of the annular wave-like section can be substantially U-shaped.

The first housing structure may have an annular base part, an annular bending part having a first thickness, and an annular rigid part having a second thickness which is greater than the first thickness. The annular rigid part and the annular bending part connect the membrane section to the base part. Further, the bending part may be at an angle with respect to the membrane section.

The pressure sensor may include a printed circuit board (PCB) arranged in the hermetic housing wherein one or more strain sensing elements are electrically coupled to the PCB by bonding wires. The electrical connection pins can be electrically coupled to the PCB by a plurality of springy electrical connection elements.

In yet another embodiment, the pressure sensor has a hermetic housing with a first housing structure that defines a cavity for receiving a fluid. The first housing structure includes a metal part, a membrane part, and a fluid facing outer surface being exposed to the fluid pressure. The hermetic housing also includes a second housing structure hermetically connected to the first housing structure. The second housing structure has a housing part with at least two openings with at least two electrical connection pins passing through the openings. The electrical pins are affixed in the openings by a non-conductive and hermetic sealing material. One or more strain sensing elements are arranged in the hermetic housing to measure the fluid pressure of the fluid in the cavity. The first housing structure may be one continuous piece of metal. The base part, the membrane part, the fluid facing outer surface, and the housing part can all be formed of metal.

In yet another embodiment, the pressure sensor includes a first housing structure having a generally annular shape. The first housing structure has an annular outer part and a base part defining a pressure supply opening for allowing the entry of a fluid. A cavity within the first housing structure can contain the fluid at a pressure. A membrane part within the first housing structure has a fluid facing outer surface, the fluid facing outer surface being exposed to the fluid pressure. One or more strain sensing elements are arranged within the first housing structure such that the strain sensing elements are in contact with the membrane part. The sensor also includes a second housing structure having a generally annular shape and hermetically connected to the first housing structure. The second housing structure includes a housing part which defines two or more openings. An electrical connection pin passes through each opening. Each pin is secured with a non-conductive and hermetic sealing. In this configuration, the strain sensing elements measure the fluid pressure within the cavity while the first and second housing structures provide a hermetic seal. The first housing structure can also include an annular wave-like section which connects the membrane part and the annular outer part. The annular wave-like section can be made up of a plurality of rigid parts and a plurality of bending parts. At least one cross section of the annular wave-like section can be substantially S-shaped.

It should be appreciated that the subject technology can be implemented and utilized in numerous ways, including without limitation as a process, an apparatus, a system, a device, and a method for applications now and later developed. Other features and advantages will become apparent from the following detailed description, taken in conjunction with the accompanying drawings which illustrate, by way of example, various features of embodiments.

BRIEF DESCRIPTION OF THE DRAWINGS

These and other aspects, properties and advantages will be explained hereinafter based on the following description with reference to the drawings, wherein like reference numerals denote like or comparable parts, and in which.

DETAILED DESCRIPTION OF PREFERRED EMBODIMENTS

The subject technology overcomes many of the prior art problems associated with hermetic pressure sensors. The advantages, and other features of the technology disclosed herein, will become more readily apparent to those having ordinary skill in the art from the following detailed description of certain preferred embodiments taken in conjunction with the drawings which set forth representative embodiments of the present technology and wherein like reference numerals identify similar structural elements. Directional indications such as upward, downward, right, left and the like are used with respect to the figures and not meant in a limiting manner.

Figure 1:
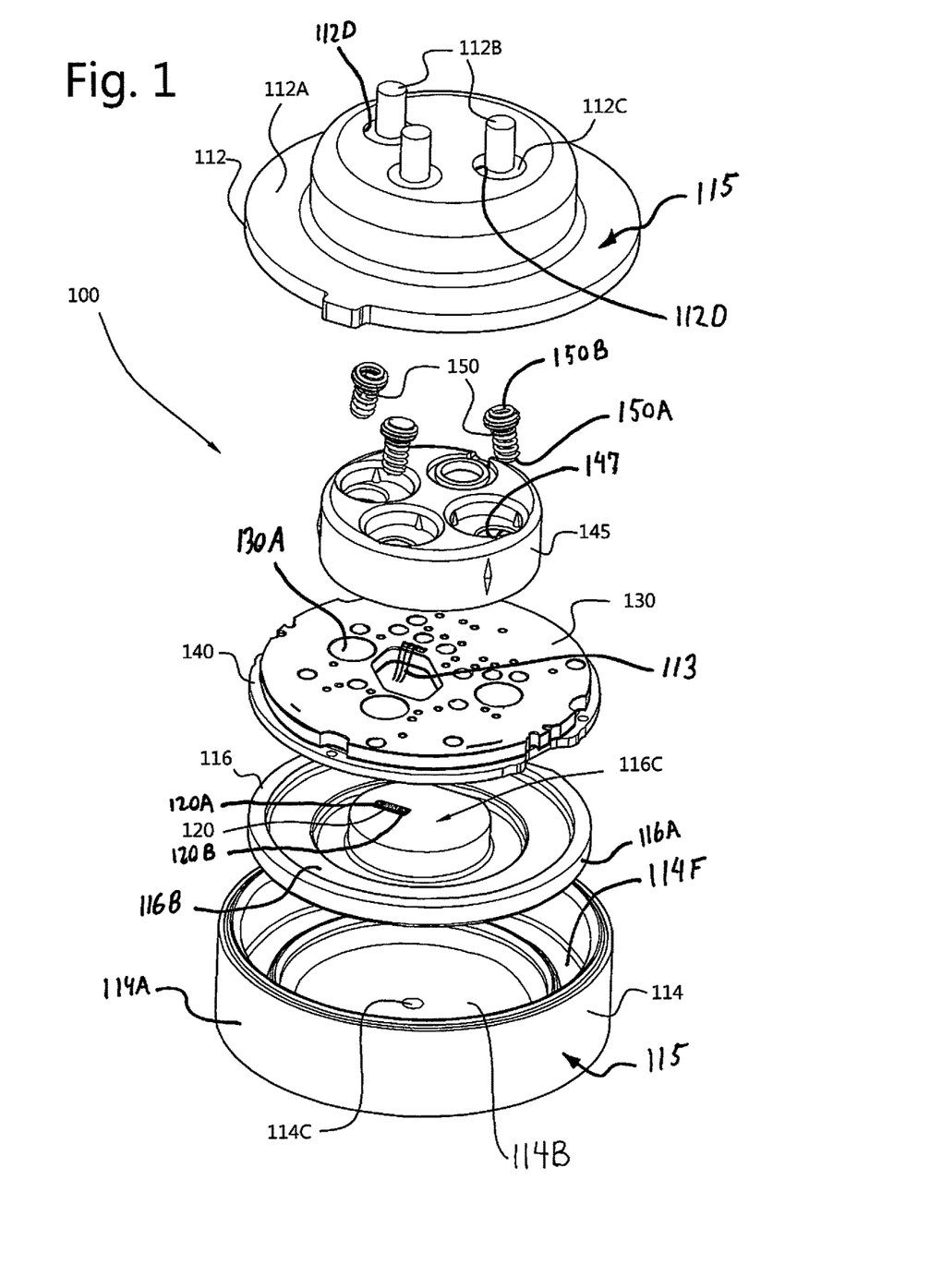
FIG. 1 is a schematic exploded view of a first embodiment of a pressure sensor in accordance with the subject technology.
Figure 2:
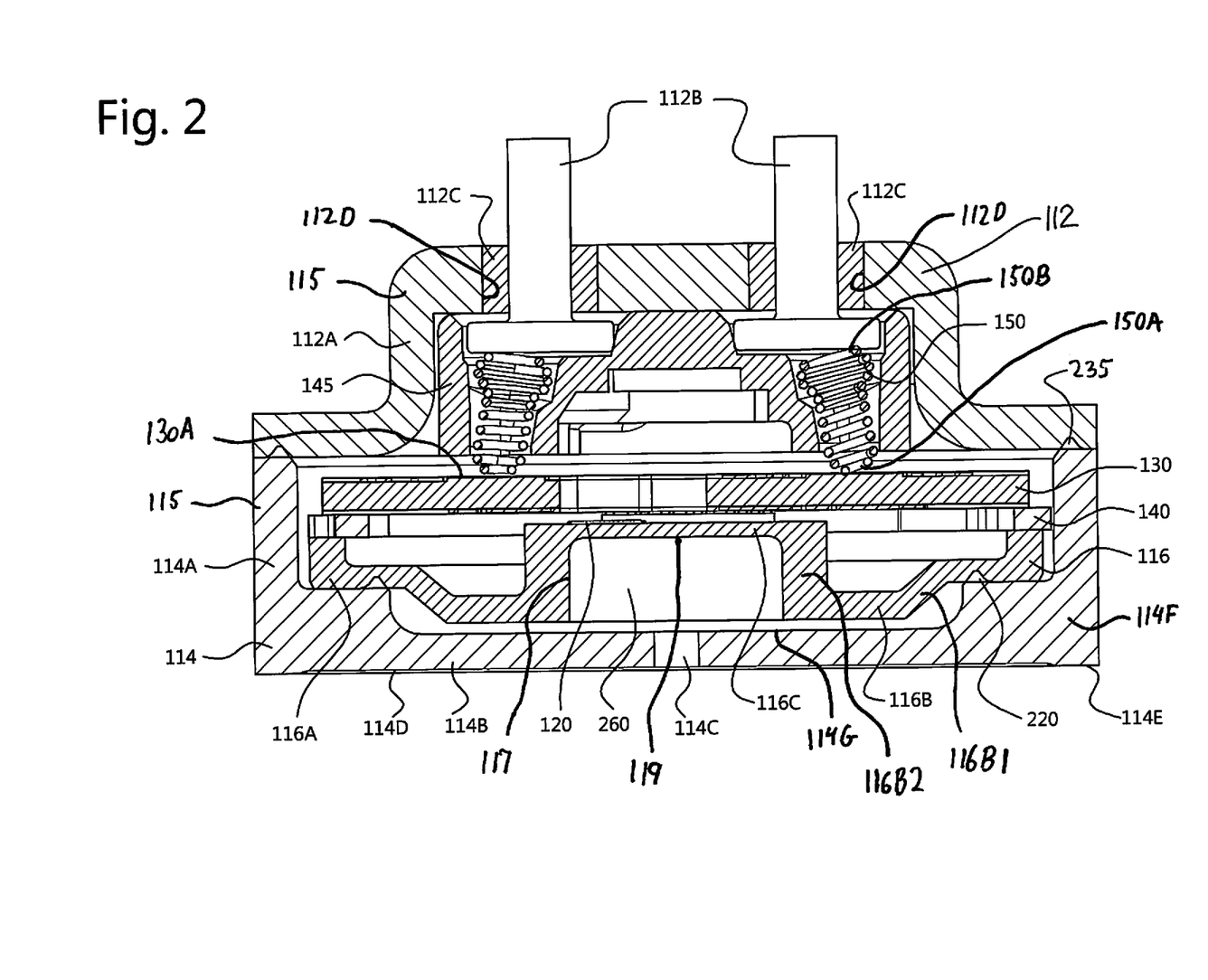
FIG. 2 is a schematic cross sectional view of the first embodiment.

FIGS. 1 and 2 show, respectively, an exploded view and a sectional view of a first embodiment of a hermetic pressure sensor 100 according to the present technology. Hermetic in the context of the present application means substantially airtight. It is envisioned that the subject technology is particularly applicable to transmission applications wherein the electronics of the sensor need to be sealed from the measured media, to prevent possible copper-sulphur corrosion. The hermetic pressure sensor 100 is robust, simple to manufacture, airtight and low-cost. The hermetic pressure sensor 100 can be used to measure pressure in harsh or dangerous environmental conditions.

The pressure sensor 100 includes a disk-shaped hermetic housing 115 with a first housing structure 114 and a second housing structure 112. Disk-shaped in the context of the present application means having a height smaller than the width of the housing. Further, the circumference of the housing structures 112, 114 are generally annular in shape. The hermetic housing 115 may have a height in the range of 0.75 cm-1.5 cm. While the disclosed housings are disk-shaped, one skilled in the art would recognize that for other applications, the housing could be in the form of a plug, wherein the first housing structure 114 includes an external thread to mount the sensor 100 in a threaded opening of a device.

Still referring to FIGS. 1 and 2, the first housing structure 114 includes a metal base part 114F and a metal membrane part 116. The base part 114F and the membrane part 116 are hermetically connected by an annular weld 220 shown in FIG. 2. The base part 114F includes a pressure supply opening 114C, a sealing surface part 114B and a side wall part 114A. A cavity 260 is formed between the membrane part 116 and the first housing structure 114. Fluid can enter the cavity 260 via the pressure supply opening 114C. In this way, the first housing structure 114 includes a fluid facing outer surface 117 which is formed by a fluid facing surface 119 of the membrane part 116 and the surface 114G of the base part 114F that is in contact with the fluid to be measured.

The membrane part 116 also includes a membrane section 116C, an annular wave-like section 116B, and an annular support section 116A. The annular wave-like section 116B surrounds the membrane section 116C and the support section 116A surrounds the annular wave-like section 116B. The membrane section 116C has a thickness which is less than the thickness of either the annular wave-like section 116B or the annular support section 116A. In one embodiment, a cross section of the annular wave-like section 116B is substantially U-shaped, as shown best in FIG. 2.

A strain sensing element 120 is attached to the membrane section 116C. The strain sensing element 120 has two strain gages 120A, 120B. The strain sensing element 120 is positioned such that one strain gage 120A is put into compression and the other strain gage 120B is put into tension when a fluid pressure is applied on the fluid facing surface 117. In another embodiment, two or more strain sensing elements are electronically coupled to four or more strain gages. In this embodiment, the angle between the line from the centre of the membrane section 116C to one of the strain sensing elements and the line from the centre of the membrane section 116C to another of the strain sensing elements is in an advantageous embodiment at 90 degrees.

In one embodiment, the strain sensing element 120 can be a microfused silicon strain gage, for example, Automotive Microfused Silicon Strain Gage (MSG) available from Sensata Technologies, Inc. of Attleboro, Mass. In this embodiment, the strain sensing element 120 is attached to the membrane section 116C by glass material, with the glass material bonded to both the strain sensing element 120 and the surface of the membrane section 116C in accordance with conventional strain gage techniques. One skilled in the art would understand that the strain sensing element 120 can include any of numerous other types of strain gages, including, a semiconductor strain gage (e.g., piezoresistors), a foil strain gage, a thin film strain gage, a thick film strain gage, a polysilicon strain gage, a capacitive strain gage, combinations thereof and the like.

In one embodiment, the second housing structure 112 includes a metal housing part 112A with three openings 112D and three electrical connection pins 112B. The three electrical connection pins 112B are affixed in the three openings 112D by a non-conductive and hermetic sealing material 112C, for example, glass. While three electrical connection pins 112B are shown in this embodiment, one skilled in the art would recognize that other numbers of electrical connection pins may be utilized to implement the subject technology.

The first housing structure 114 and the second housing structure 112 are hermetically connected to each other by means of an annular weld 235. When connected, the housing structures 112, 114 define a compartment wherein a stack of components are positioned. The stack includes a support ring 140, a PCB 130, springy electrical connection elements 150 and an alignment structure 145. The PCB 130 includes electronic circuitry. The electronic circuitry is arranged to perform at least one of the following actions: temperature compensation of electrical signals generated by the strain sensing element 120 forming a Wheatstone bridge, calibration, internal fault detection, converting the electrical signal(s) from the strain sensing element 120 to a conditioned measurement signal, i.e. a signal indicative of the fluid pressure, etc. Bonding wires 113 connect the strain sensing element 120 to the electronic circuitry. The electronic circuitry can further be configured to perform the necessary calibration processes. The support ring 140 is welded to a raised edge of the membrane part 116. The PCB 130 is coupled to the support ring 140 by mean is a reflow soldering process. The alignment structure 145 comprises openings 147 to receive the springy electrical connection elements 150. In the present embodiment, the springy electrical connections elements 150 are in the form of an open-coil helical spring. The alignment structure 145 aligns first ends 150A of the springy electrical connection elements 150 on contact areas 130A on the PCB 130 and aligns opposite second ends 150B on the electrical connection pins 112B. In the embodiment shown, the springy electrical connection elements 150 are shown as open-coil helical springs. One skilled in the art would understand that the springy electrical connection elements 150 may be formed in other ways, such as U-shaped flat springs, S-shaped flat springs, a conductive rubber material, or a conductive elastometric composite, for example. Furthermore, while in the embodiment shown springy electrical connection elements 150 couple the connection point to the PCB 130, one skilled in the art would recognize that the springy electrical connection elements 150 could be replaced by a flex foil.

A characteristic of the annular wave-like section 116B is that the "wave" enlarges the mechanical path between membrane 116C section and the outer surfaces of the hermetical housing 115. As a result of this, the sensor 100 is less sensitive for point forces and uniform concentric forces acting on the housing 115. Therefore, the annular wave-like section 116B allows the sensor to cope with non-uniform forces on the sensor housing 115 without significant effect on the output signal.

In use, an O-ring (not shown) is compressed between the sealing surface 114D of the housing 115 and a surface of the device for which fluid pressure has to be measured. The O-ring is centered around the pressure supply opening 114C. The sealing surface 114D is a recess with a small depth in the lower side of the housing. Flanges 114E around the sealing surface 114D protect the O-ring from compressing and damaging of the sealing surface when the mounting force becomes high. The compression force of the O-ring will push the sealing surface part 114D upwards by a uniform concentric force around the supply opening 114C. As a result, the base part 114F will deform and resultant forces will act on the annular support section 116A of the membrane part 116. The thinnest part 116B1 of the wave-like section 116B will deform while the rigid part 116E32 of the wave-like section 116 will deform minimally. In this way, the influence of concentric and point forces acting on the housing 114 on the surface of the membrane section 116C are reduced significantly. It should be noted that the deformation of the bottom side of the housing 114 is larger as the size of the O-ring decreases. Furthermore, as "flexible" bonding wires 113 are used to couple the strain sensing elements 120 on the membrane section 116C to the PCB 130, the membrane section 116C is mechanically decoupled for force acting on PCB 130 due to the springy electrical connection elements 150.

Figure 3:
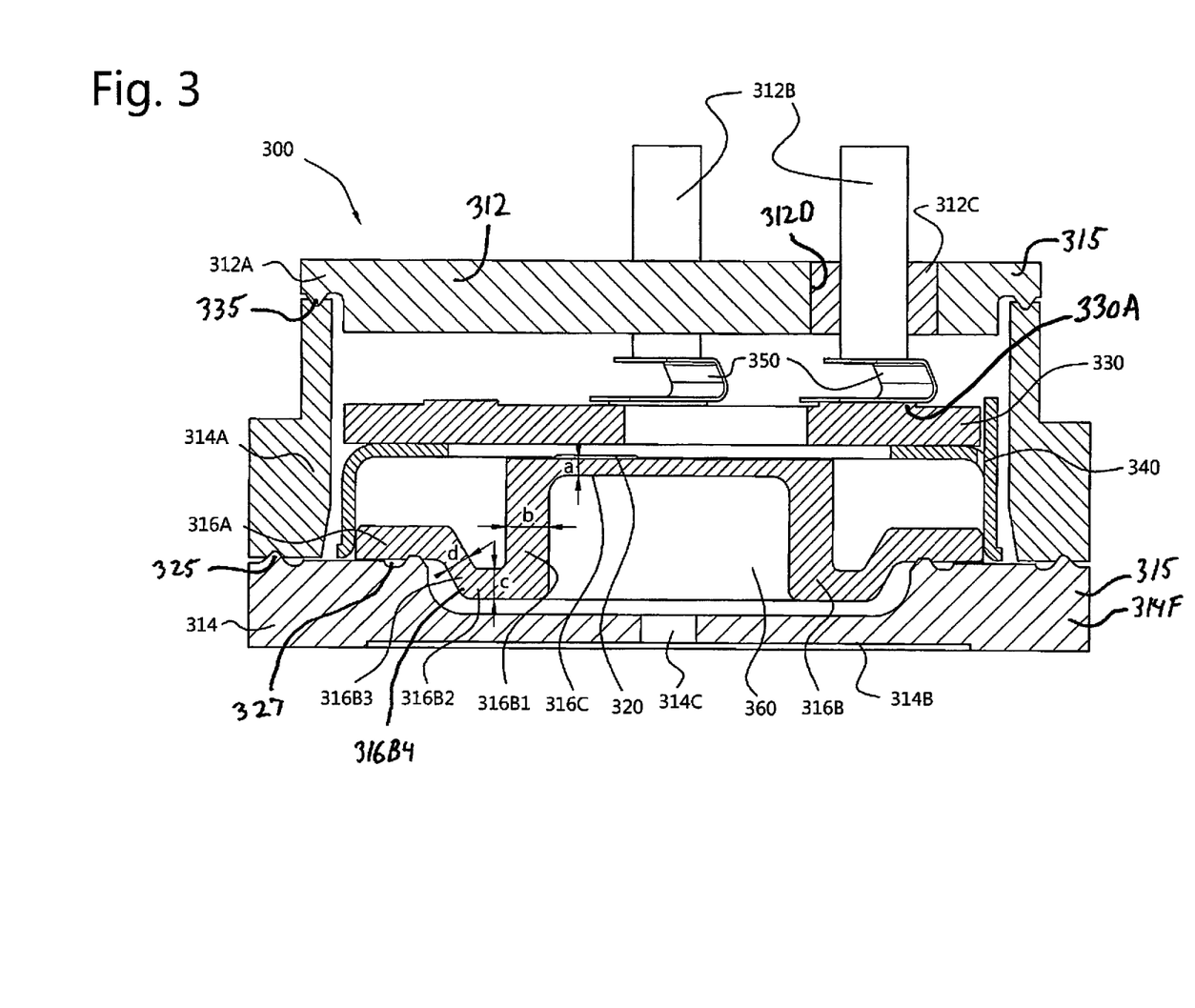
FIG. 3 is a schematic cross sectional view of a second embodiment of a pressure sensor in accordance with the subject technology.

FIG. 3 shows a cross sectional view of a second embodiment of a pressure sensor 300 according to the subject technology. The second embodiment differs mainly in the composition of the disk-shaped hermetic housing 315. The hermetic housing 315 includes a base part 314F, a membrane part 316, a sidewall part 314A and a cover part 312A. The membrane part 316 is hermetically connected to the base part 314F by means of an annular weld 327. The sidewall part 314A is hermetically coupled to the bottom part 314B by means of an annular weld 325. The cover part 312A is hermetically coupled to the sidewall part 314A by means of an annular weld 335. Depending on the implementation of the manufacturing process, the assembly of the base part 314F, membrane part 316 and sidewall part 314A can form the first housing structure 314 and the cover part 312A can form the second housing structure 312. Alternatively the assembly of base part 314F and the membrane part 316 can form the first housing structure 314 and the assembly of the sidewall part 314A and the cover part 312A can form the second housing structure 312. The hermetic housing 315 includes a support structure 340 and a PCB 330. The support structure 340 is coupled to the PCB 330 by a reflow process. The combined support structure 340 and PCB 330 are attached to an edge of a vertical surface of the first housing structure 314 by a glue, weld, or epoxy.

For the pressure sensor 300, the cover part 312A has two openings 312D and two electrical connection pins 312B. One skilled in the art would recognize that more or less openings and electrical connection pins may be used. The electrical connection pins 312B pass through the openings 312D in the cover part 312A and are affixed within the openings 312D by a non-conductive hermetic sealing material 312C. The springy electrical connection elements 350 electrically connect circuitry on the PCB 330 to the electrical connection pins 3126. In this embodiment the springy electrical connection elements 350 are in the form of U-shaped flat springs. The flat springs are reflowed to contact surfaces of the PCB 330. During assembly of the first and second housing structures 314, 312, the springy electrical connection elements 350 are pressed against the ends of the connecting pins 312B which project into the interior of the hermetic housing 315. One skilled in the art would understand that the springy electrical connection elements 350 may be other shapes, for example, S-shaped flat springs. It might further be possible to form springy electrical connection elements 350 of conductive rubber material or conductive elastomeric composites.

In FIG. 3, the thickness of the respective sections of the membrane part 116 are indicated by "a", "b", "c", and "d". The membrane part 316 comprises the following sections: the membrane section 316C, an annular rigid part 316B1, an annular bending part 316B4 and an annular support section 316A. The membrane section 316C has a thickness "a". The annular rigid part 316B1 is angled with respect to the plane of the membrane section 316C and has a thickness "b", wherein thickness "b" is greater than the thickness "a". The annular bending part 316B4 has two annular sections 316B2, 316B3. The first annular section 316B2 is substantially parallel to the membrane section 316C and has a thickness "c". The second annular section 316B3 is angled with respect to the first annular section 316B2 and has a thickness "d". The individual thickness of both "c" and "d" is less than the thickness "b" and greater than the thickness "a". If a mounting force is acting on or via the base part 314F, the force has to pass first the annular bending part 316B4 and subsequently the annular rigid part 316B1 before a resultant of the force will be acting on the membrane section 316C. As the bending part 316B4 is thinner than the rigid part 316B1, the main part of the mounting force will result in bending of the bending part 316B4 and only a small remaining part will act on the rigid part 316B1. Consequently, an even smaller part of the force acting on the remaining part will pass the annular rigid part 316B1 and influence stress on the membrane section 316C. In this way, the sensitivity for both point (asymmetrical) and uniform (concentric) forces acting on the exterior of the hermetic housing 315 is reduced significantly by the annular wave-like section 316B which includes the annular rigid part 316B1 and the annular bending part 316B4.

Figure 4:
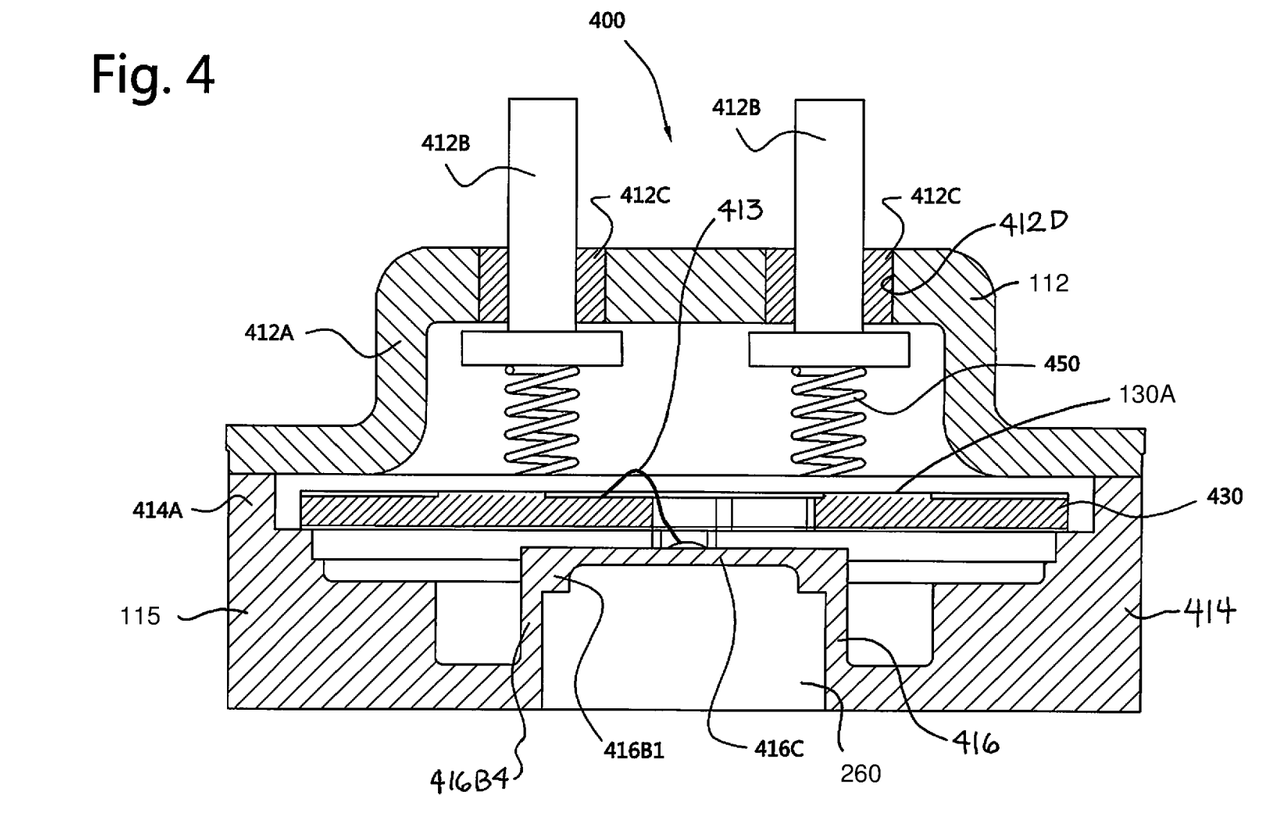
FIG. 4 is a schematic cross sectional view of a third embodiment of a pressure sensor in accordance with the subject technology.

FIG. 4 shows schematically a sectional view of a third embodiment of hermetic pressure sensor 400 according to the subject technology. This embodiment differs from the previous embodiment in that the first housing structure 414 and the membrane part 416 are formed out of one piece of metal. One advantage of sensor 400 is that the sensor 400 is less complex. A disadvantage is that the membrane could easily be reached through the large port 414C by objects and thus be damaged. To reduce the influence of forces acting on the first housing structure 414, the membrane section 416C is surrounded by an annular rigid part 416B1. An annular bending part 416B4 connects the annular rigid part 416B1 to the annular outer part 414A of the first housing structure 414. The annular bending part 416B4 has a thickness which is less than the thickness of the rigid part 416B1. Furthermore, the annular bending part 416B4 is angled with respect to the membrane section 416C. The way to reduce the influence is similar to that in the previous embodiments. In this embodiment, the springy electrical connection elements 450 are open-coil springs with a central axis perpendicular to the PCB 430.

Figure 5:
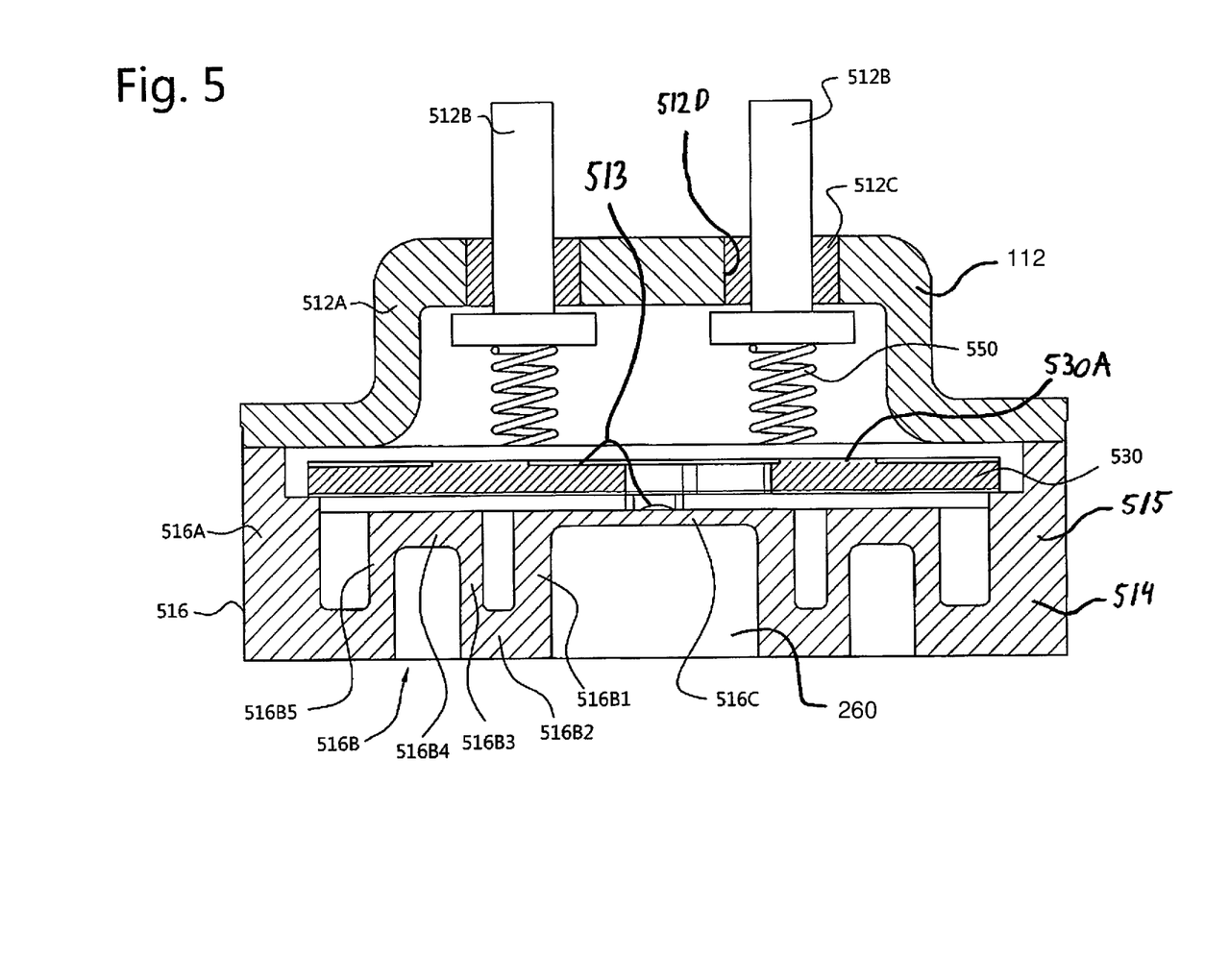
FIG. 5 is a schematic cross sectional view of a fourth embodiment of a pressure sensor in accordance with the subject technology.

FIG. 5 shows a schematic sectional view of a fourth embodiment of a pressure sensor 500 with a hermetic housing 515 with reduced sensitivity for forces acting on the hermetic housing 515. This embodiment differs from the third embodiment in the wave-like section 516B which couples the membrane section 516C to the annular outer part 516A. In this embodiment, the mechanical path between the annular outer section 516A and membrane section 516C is increased further. The annular wave-like section includes a first rigid part 516B1, 516B2, a first bending part 516B3, a second rigid part 516B4 and a second bending part 516B5. The membrane section 516C has the thinnest thickness of all components of the membrane part 516. The bending parts 516B3, 516B5 are thinner than rigid parts 516B1, 516B2, and 516B4. The first rigid part 516B1, 516B2 comprises a vertical part 516B1 and a horizontal part 516B2. In general, surrounding the membrane section 516C with a rigid part can reduce the influence of parasitic effects in the measured pressure signal. If the vertical part 516B1 has a comparable thickness as the membrane section 516C, a fluid pressure acting on the membrane part 516 will bend both the membrane section 516C and the vertical part 516B1. However, the bending of the vertical part 516B1 will influence the stress in the membrane section 516C and thus influence the measured fluid pressure. By having a rigid part surrounding the membrane section 516C, this kind of distortion in the measured fluid pressure is reduced.

The presented embodiments are suitable for, among other things, transmission application in the automotive industry which measures pressure in an operating range of 0-20 Bar and which withstands pressure spikes in the measured medium up to 120 Bar. For other applications, the operating range could be 0-70 Bar. When measuring relatively low pressures, it is important that there is a constant internal pressure in the housing. The subject technology reduces the number of required welds and the necessary weld length and thereby creates fewer potential leak paths. Furthermore, glass-to-metal seals 112C are only used in the openings 112D of the second housing structure 112 around the connection pins 112B. As this side is not subjected to the fluid pressure to be measured, the risk of damage to the glass-to metal seals 112C due to fluid pressure variations is negligible.

All patents and other references disclosed herein are hereby expressly incorporated in their entireties by reference. While the subject technology has been described in terms of several embodiments, it is contemplated that alternatives, modifications, permutations and equivalents thereof will become apparent to those skilled in the art upon reading the specification and upon study of the drawings. The subject technology is not limited to the illustrated embodiments. Changes can be made without departing from the scope of the appended claims.

The invention claimed is:

1. A hermetic pressure sensor for measuring a fluid pressure comprising:
a hermetic housing including: a first housing structure; a second housing structure hermetically connected to the first housing structure to form an interior; a membrane section within the interior, the membrane section arranged to be exposed to the fluid pressure; and one or more strain sensing elements arranged in the interior and attached to the membrane section; and an annular wave-like section disposed between and connecting the membrane section to the first housing structure to form a mechanical path between the membrane section and the hermetic housing to reduce the effect of non-uniform forces on the hermetic housing on an output signal from the one or more strain sensing elements, wherein the second housing structure includes: a housing part, the housing part having at least two openings with an electrical connection pin passing through each of the at least two openings, the electrical pins being affixed in the respective openings by a non-conductive and hermetic sealing material.

2. The pressure sensor according to claim 1, wherein:
the first housing structure includes: a base part including a pressure supply opening; and a membrane part including the membrane section, the membrane part being hermetically connected to the base part;
the base part, the membrane part, and the pressure supply opening define a cavity, said cavity arranged to put the membrane section in pressure contact with the fluid.

3. The pressure sensor according to claim 2, wherein the base part and the membrane part are hermetically connected by an annular weld.

4. The pressure sensor according to claim 1, wherein the first housing structure and the second housing structure are hermetically connected by an annular weld.

5. The pressure sensor according to claim 1, wherein at least one cross section of the annular wave-like section is U-shaped.

6. The pressure sensor according to claim 1, further comprising a printed circuit board (PCB) arranged in the hermetic housing wherein the one or more strain sensing elements are electrically coupled to the PCB by bonding wires.

7. The pressure sensor according to claim 6, wherein the electrical connection pins are electrically coupled to the PCB by a plurality of springy electrical connection elements.

8. The pressure sensor according to claim 1, wherein the hermetic housing is disk-shaped.

9. The pressure sensor according to claim 1, wherein the one or more strain sensing element is a micro fused silicon strain gage.

10. The pressure sensor according to claim 1, wherein the annular wave-like section is made up of a plurality of rigid parts and a plurality of bending parts.

11. The pressure sensor according to claim 1, wherein each rigid part has a thickness, each bending part has a thickness, and the fluid facing outer surface of the membrane part has a thickness, the thickness of each bending part being greater than the thickness of the fluid facing outer surface of the membrane part and less than the thickness of each rigid part.

12. The pressure sensor according to claim 11, wherein at least one cross section of the annular wave-like section is S-shaped.

13. The pressure sensor according claim 1, further comprising:
a membrane part comprising the membrane section, the annular wave-like section, and an annular support section,
wherein:
the annular wave-like section comprises an annular rigid part and an annular bending part;
the membrane section is attached to the annular rigid part;
the annular bending part is attached to the annular rigid part and the annular support section; and
the annular support section attaches the membrane part to the first housing structure.

14. A hermetic pressure sensor for measuring a fluid pressure comprising:
a hermetic housing including: a first housing structure; a second housing structure hermetically connected to the first housing structure to form an interior; a membrane section within the interior, the membrane section arranged to be exposed to the fluid pressure; and one or more strain sensing elements arranged in the interior and attached to the membrane section,
wherein:
the second housing structure includes: a housing part, the housing part having at least two openings with an electrical connection pin passing through each of the at least two openings, the electrical pins being affixed in the respective openings by a non-conductive and hermetic sealing material;
the first housing structure includes: an annular support section; an annular base part; an annular bending part having a first thickness; and an annular rigid part having a second thickness, said second thickness being greater than the first thickness; and
the annular support section connects the annular base part to the annular bending part and the annular rigid part connects the membrane section to the annular bending part to enlarge a mechanical path between the membrane section and the hermetic housing, thereby reducing the effect of forces on the hermetic housing on the one or more strain sensing elements.

15. The pressure sensor according to claim 14, wherein the annular bending part is at an angle with respect to the membrane section.

16. A hermetic pressure sensor for measuring a fluid pressure comprising:
a first housing structure having a generally annular shape including: an annular outer part; a base part defining a pressure supply opening for allowing the entry of a fluid; a cavity for containing the fluid at the fluid pressure; a membrane part having a fluid facing outer surface, the fluid facing outer surface being exposed to the fluid pressure; and one or more strain sensing elements arranged in contact with the membrane part; and
a second housing structure having a generally annular shape and being hermetically connected to the first housing structure, including: a housing part defining two or more openings; two or more electrical connection pins passing, each pin passing through one of the two or more openings; a non-conductive and hermetic sealing material disposed to secure the two or more electrical pins in place with respect to the two or more openings;
wherein:
the strain sensing elements measure the fluid pressure within the cavity while the first and second housing structures provide a hermetic seal; and
the first housing structure includes an annular wave-like section disposed between and connecting the membrane part and the annular outer part to form, a mechanical path between the membrane section and the outer surfaces of the hermetic housing.

17. The pressure sensor according to claim 16, wherein the first housing structure is one continuous piece of metal.

18. The pressure sensor according to claim 16, where the base part, the membrane part, the fluid facing outer surface, and the housing part are metal.

* * * * *